Figure 1:
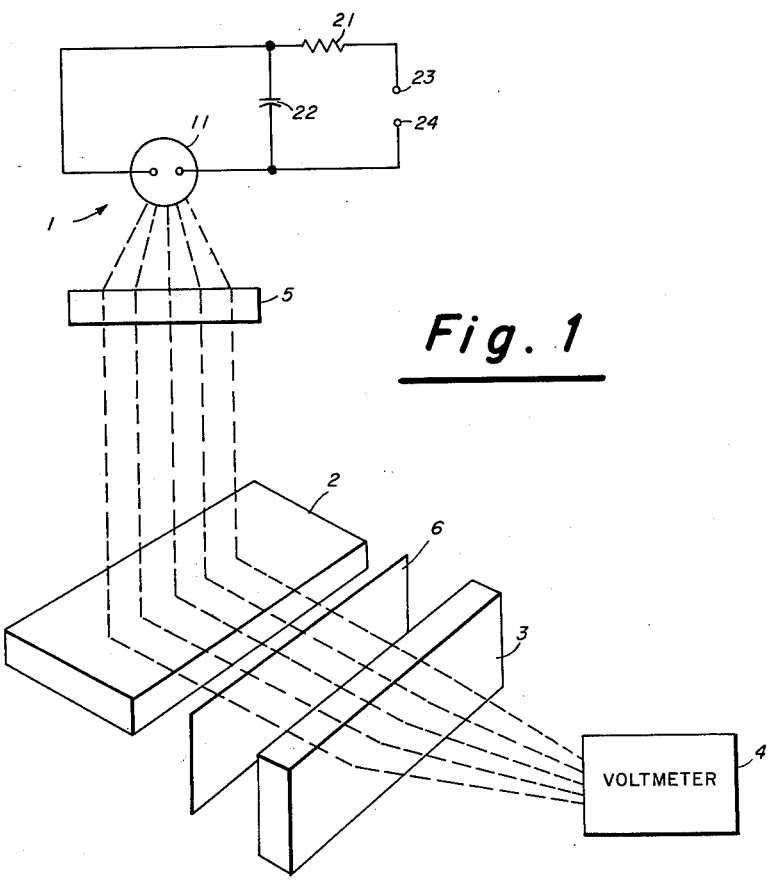

July 16, 1963   G. A. WORK   3,098,156
NUCLEAR RADIATION DOSIMETER READER APPARATUS
Filed July 29, 1960   2 Sheets-Sheet 1

INVENTOR.
GEORGE A. WORK
BY
ATTORNEYS

July 16, 1963

G. A. WORK 3,098,156

NUCLEAR RADIATION DOSIMETER READER APPARATUS

Filed July 29, 1960

2 Sheets-Sheet 2

INVENTOR.
GEORGE A. WORK
BY
ATTORNEYS

United States Patent Office 3,098,156
Patented July 16, 1963

3,098,156
NUCLEAR RADIATION DOSIMETER READER
APPARATUS
George A. Work, 520 E. Adams, Apt. 17
Long Beach, Calif.
Filed July 29, 1960, Ser. No. 46,318
4 Claims. (Cl. 250—71.5)
(Granted under Title 35, U.S. Code (1952), sec. 266)

The invention described herein may be manufactured and used by or for the Government of the United States of America for governmental purposes without the payment of any royalties thereon or therefor.

The present invention relatese to dosimeter readers and, more particularly, to readers adapted to indicate the radiation exposure of phosphate glass-type dosimeters.

The phosphate glass-type of dosimeter has shown considerable promise as a military radiac and, as is known, the characteristics of this dosimeter are such that, when exposed to light in the near ultra-violet region, an orange fluorescence is exhibited. Further, since this fluorescence is of an intensity proportional to the gamma radiation absorbed by the phosphate glass, readings of the intensity become a measure of the radiation absorption. Readers for these dosimeters therefore must contain a light source to produce the orange fluorescence as well as a means for measuring the fluorescence intensity. Such readers, of course, have been provided but, for one reason or another, they have presented a number of difficulties.

For example, the present readers mostly use an incandescent or a glow tube type ultra-violet source, while the orange fluorescence is measured by a photo multiplier tube with associated amplifier and indicator circuits. One marked deficiency is the fact that the ratio of light output to input at radiation exposures of less than 1000 R is so small that an overall photo current amplification in the order of $10^6$ or $10^7$ has been required. Also, at very low light levels the photo multiplied dark current is a significant contribution to the output current, the result being that the obtainable signal to noise ratios are disappointing. The low light levels present another difficulty more mechanical in nature in that the readers necessarily must be constructed with complex light locks. Thus, because the tolerable ambient light level is extremely low, such light locks are required to avoid interferences which again would affect the signal to noise ratios. While it is true that the so-called dark current limitations can be minimized by using special multiplier tubes, such an expedient is not too acceptable because of a corresponding substantial increase in cost.

A further quite significant limitation is the fact that these presently-available readers require about three to fifteen watts of electrical power to drive the ultra-violet light source. When it also is considered that suitable detecting, amplifying and indicating circuitry can function on a total power range of less than 100 milliwatts, it readily can be seen that the light sources used have heavily handicapped the existing apparatus to the extent that it has evolved as relatively heavy, complex pieces requiring line sources of power and involving many extra components for stabilizing and regulating the various circuit potentials. Of particular interest, is the fact that the light sources used have, for the most part, prohibited any portable design.

It is therefore an object of the present invention to provide a phosphate glass-type dosimeter reader capable of accurately determining radiation exposures of less than 1000 R.

Another object related to the foregoing one is the provision of a reader having a high ratio of light output to input at radiation exposures of less than 1000 R.

Yet another object is to provide such a reader having excellent signal to noise ratios.

A still further object is to eliminate the need for complex light locks in phosphate glass-type dosimeters, as well as the need for special multiplier tubes in lieu of light locks.

A still further important object is to provide a portable phosphate glass-type dosimeter reader capable of operating from a relatively low D.C. power supply.

These and other objects of the present invention are achieved primarily by providing an arc discharge type of light source, as well as a light source driving means capable of producing high peak intensity light pulses. The pulses, of courses, are directed onto the glass dosimeter and photoelectric detector means are employed for converting the resulting fluorescence into a photo-electric current of proportionate peak intensity. Finally, a photoelectric current-indicating means provides the actual reading and, most suitably, such a means includes a peak volt meter having its output coupled to a conventional bridge volt meter.

Some of the advantages of such an arrangement should readily be apparent, although, these and other advantages will be considered in a more detailed manner in the ensuing description. For example, it is preferred to employ a relaxation oscillator as the light source driving means and, using such an oscillator, peak currents in the order of hundreds of amperes are obtainable so that a high ratio of light output to input can be achieved. Also, the pulses formed by such a light source driving means can be so regulated with regard to shape and repetition rate that their duty cycle becomes quite low in the order of one part in $10^5$. Consequently, the power consumed by the ultra-violet light at a reasonable firing rate can be made a small part of the overall power requirements of the instrument. Since the remaining detecting circuit components of the system still require no more than 100 milliwatts, it is apparent that the power requirements readily come within the limitations imposed by portability of the equipment. For reasons similar to those already expressed, the signal to noise ratio is much improved and the concern regarding ambient light levels is greatly minimized.

Figure 2:
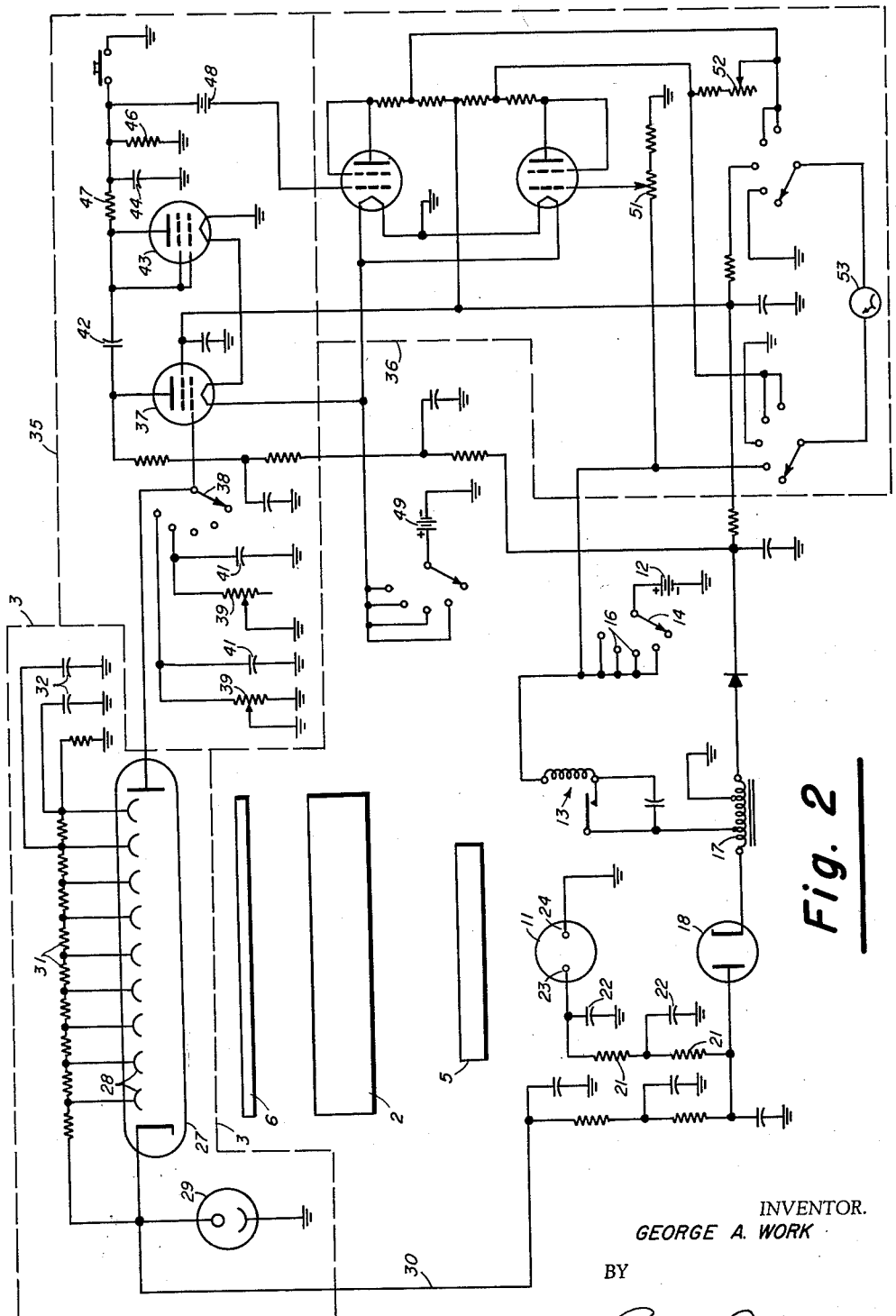

The preferred embodiment of the invention is illustrated in the acompanying drawings in which:

FIG. 1 is a schematic illustrating in block form the method and apparatus employed; and FIG. 2 a circuit diagram for the reader.

Referring to the drawings, the general arrangement for accomplishing the purpose of this invention is illustrated in FIG. 1 in which it may be seen that a high intensity pulsed light source 1 is directed onto a dosimeter 2 to produce a fluorescence sensed by photo detector 3 and metered by a suitable voltmeter 4.

Preferably, the light source is filtered in an ultra-violet transmissive filter 5 and its fluorescence also filtered in another orange filter 6. Dosimeter 2, as indicated, is of the phosphate glass type which, when exposed to light near the ultra-violet spectral region, exhibits an orange fluorescence of an intensity proportional to its absorbed radiation. One such dosimeter, known as the DT-60, has been quite widely used as a personnel dosimeter, and, of course, the object of the present reader is to ascertain what, if any, exposure has occurred. It may be noted that the present arrangement bears broad similarity to earlier readers in that most readers also have employed the ultra-violet source to produce the fluorescence, as well as detectors and meters to derive the exposure information measured by the fluorescence intensity.

The principal features of the present invention reside in the use of a high intensity pulsed light source, as well as the provision, as needed, of special means enabling a reliable metering of the excited fluorescence. These features are shown in FIG. 2 to which attention is directed. As there seen, high intensity light source 1 of FIG. 1 is provided by an ultra-violet arc discharge lamp 11 having as a primary power supply source, a six volt battery 12, preferably formed of four type 0 flashlight cells. The ability to use such a primary source permits portability and is a significant factor.

The battery power is delivered to a conventional vibrator 13 through a switch arm 14 having a plurality of posts 16, this switch, in actual practice, being a part of a wafer switch that includes other arms and contacts to be described. Primarily, switch arm 14 is used for "on" and "off" positions.

The relatively low voltage A.C. current produced by vibrator 13 is delivered to a high voltage transformer 17 after which it is electronically rectified in a tube 18 for providing the high voltage necessary to drive light source 11 as well as the previously mentioned photo detector 3.

One of the principal features is the manner in which this high voltage is employed to pulse the discharge of lamp 11, it being recalled that the object is to form high intensity pulses which are most beneficial in permitting the detection of low level radiation. Preferably, the high intensity pulses are achieved by employing a relaxation oscillator circuit formed in a conventional manner of resistors 21 and capacitors 22, the plates of capacitors 22 being parallel with electrodes 23 and 24 of the discharge lamp so as to charge to a firing potential through resistors 21.

Obviously, the firing potential which controls the capacitor discharge is the arcing or firing potential of electrodes 23 and 24 and, to achieve the desired pulse intensity, this potential may be in the order of 1500 volts although a level of 1250 volts presently is preferred because the higher voltage has been found to impose too heavy a load on the particular vibrator and transformer employed. It also appears to be better practice to avoid mercury arc discharge lamps because of the large amount of thermal power necessary to vaporize the mercury and start the arc. The vapor pressure of mercury seems to be too low to use this element in the vapor form at room temperature and it is negligible at a temperature below 40° C. Consequently, a discharge tube filled with a noble or a relatively inert gas is used to provide the necessary characteristics and, of the more common gases, argon and nitrogen have a nearly optimum arc spectrum. In the DT-60 dosimeter, the peak of the excitation spectrum is about 3200 A. while the emitted spectrum of the glass is about 6000 A.

Discharging such a lamp at its firing potential, peak currents in the order of hundreds of amperes are obtainable with very simple configurations. As will be appreciated, not only a wide range of intensities may be obtained by varying the R, C and E constants, but the rate of discharge or pulse rate itself is a variable dependent upon the arc resistance, the internal resistance of the capacitor, its capacity and the inductance of the lead wires. Using a lamp with a firing potential of 1500 volts and employing oscillator resistances of 3.3 megohms to charge capacitors of .005 and .01 microfarad, the pulses produced had a repetition rate of 10 p.p.s. and were found to have a measured rise time of about 0.10 microsecond, extinguishing within about 0.5 microsecond. It is to be noted that, with such a repetition rate, the duty cycle of the pulses is about one part in $10^5$. The significant consideration applicable to this low duty cycle is the economy of the average input power. The power consumed by the ultraviolet light at a reasonable firing rate is in the order of 0.05 watt which obviously is a small part of the overall power requirements of a portable radiac instrument. By way of comparison, an argon glow lamp of the type familiarly used in other DT-60 readers has an average input power requirement of 3.6 watts, while other light sources require up to 15 watts. Further comparing the present pulsed arc lamp with the more conventional argon glow lamp, the following data has been determined:

|  |  | Pulsed Arc | Argon glow lamp |
| --- | --- | --- | --- |
| Repetition rate | p.p.s. | 10 | 120 |
| Duty cycle | percent | 0.001 | 25 |
| Average input power | watts | 0.05 | 3.6 |
| Photo tube current (peak) | μa | 50 | 0.015 |

Effective peak power levels of tens or hundreds of kilowatts are possible with very low average powers, depending upon the duty cycle of the lamp.

Referring again to FIG. 2, the pulses of lamp 11 are directed onto dosimeter 2 which fluoresces with an orange light the intensity of which varies proportionately with the gamma radiation absorbed by the phosphate glass of the dosimeter. The orange light first is filtered through contrast orange light filter 6 and then applied to photo detector 3 which, as shown, includes a photomultiplier tube 27 having a plurality of dynodes 28 and a corona regulator 29. To power the photomultiplier and the regulator, the high voltage derived from the transformer and rectified battery power supply is conducted through a branch supply line 30. These photo detector elements are conventional, although, along with the firing potential of lamp 11, they dictate the basic parameters in the design of the entire high voltage power supply system. In particular, the starting voltage of corona regulator 29 must be considered. It may be found desirable in some instances to increase the size of resistors 31 of the divider circuit of tube 27 to about 10 megohms. The current requirements of the photomultiplier are determined only by infrequent sharp pulses and capacitors 32 across the last two dynodes insure that there will be no appreciable voltage drops caused by signal currents.

One factor that may be noted at this point is that the reader may, if desired, be run from a 110 volt line since, of course, this voltage can be stepped down, rectified and substituted for the B batteries. Such paralleling is considered good practice because the batteries have a larger effective capacitance permitting them to serve as a filter. Thus, the A.C. component in the rectified D.C. somewhat increases the battery life by its action on the depolarizer.

The output photoelectric current of the photomultipler has an intensity determined by the intensity of the orange fluorescence which, in turn, is dependent upon the pulse intensity and the radiation absorbed by the dosimeter glass. Since the light pulse intensity can be made a constant, variations in the photoelectric current become a function of the absorbed radiation so as to provide the desired exposure reading. A notable effect is that because the source strength has been increased by a factor of $10^4$ or more, the signal to noise ratio is improved by roughly that figure.

The metering of the photocurrent most suitably is accomplished by means of a peak voltmeter 35 followed by a conventional bridge voltmeter 36. The peak voltmeter also is conventional in that circuitry capable of accomplishing its purpose is known. However, because the meter must be capable of indicating the peak amplitude of the detected signal, which, as will be recalled, may have a duty cycle of about one part in $10^5$, conventional peak voltmeters, such as the Ballantine 305, will not operate. The illustrated circuitry of the peak voltmeter provides an extraordinary smoothing or pulse-stretching factor enabling subsequent accurate response in the bridge voltmeter.

Thus, as shown in FIG. 2, the pulsed photocurrent output from the multiplier plate is applied to the grid of the first tube of the peak voltmeter, this tube 37 preferably being a CK 512 having a filament voltage of 0.65 volt at a current drain of 20 ma. This power drain is quite low and possibly as low as can be achieved with existing tube types. Although the transconductance and emission capabilities of this tube are low, there is a sacrifice in high frequency response, but this compromise can be made because of the available peak voltage. A part of the smoothing or pulse lengthening is achieved through RC circuits coupled to the photo tube output through a switch 38, these RC circuits including resistors 39 and capacitors 41 having different values for different operating levels. Considering one RC circuit, a capacitor 41 charges through the photocurrent flow, discharging through its resistor 39 so as to lengthen the pulse roughly to the discharge time constant of RC. Again, although there is a corresponding decrease in pulse height, there is amplitude to spare. Switch 38 is a structural part of the previously mentioned wafer switch and its function is to provide an RC time constant selectivity.

Continuing with the peak voltmeter circuit, the negative pulse applied to the grid of tube 37 causes its plate voltage to rise charging another capacitor 42 through a second CK 512 tube 43. A third capacitor 44 eventually is charged to the peak amplitude of the signal voltage across capacitor 42, capacitor 44 discharging through a resistor 46. To permit this action it is necessary to use a line resistor 47 which is of substantially less resistance than resistor 46. For example, resistor 46 may have a value of 100 megohms and resistor 47 a value of 3.3 megohms. Again, the RC product determines the output smoothing and, although the overall voltage gain is very small, the required smoothing factor has been realized.

The filtered signal at the output of the peak voltmeter is applied to bridge voltmeter 36 which is strictly conventional and should need but little description. It may, however, be noted that the proper biases for the bridge voltmeter tubes is provided by bias battery 48, while the filament power for its tubes, as well as thermionic tubes 37 and 43, is taken from another 1.5 volt battery 49.

The only other factor of interest in voltmeter 36 is the provision for "zero" and "calibrate" controls. As seen, these controls are supplied by potentiometers 51 and 52 respectively. Zero control serves a dual function of first balancing the bridge voltmeter at zero input and also balancing out the "predose" of the DT–60 dosimeter. This "predose" is a fluorescence present before the dosimeter has been irradiated and a "zero" glass dosimeter is used for this purpose. The "calibrate" control establishes the scale factor of an indicating meter 53 and, again, a glass of some standard fluorescent level is employed. The "calibrate" need exists because the peak intensity of the ultraviolet light source is not stable. Optimum design could well dispense with both "zero" and calibrate," although the expense might not be justified.

The intended operation of the dosimeter reader should be apparent from the foregoing description. Most of its advantages also have been enumerated and, as can now be appreciated, they stem in large part from the high intensity, short pulse light used to excite the dosimeter. Thus, the high intensity pulses produce a highly-peaked photoelectric current output which greatly improves the signal-to-noise ratio. Also, the operating level is instrumental in eliminating the need for complex light locks previously used to exclude ambient light. In the present arrangement, any convenient manner can be employed to place the dosimeter in position to be read. For example, the familiar slide used in coin-operated machines can be used without concern for excluding light.

The instrument is specially suited for providing accurate readings of relatively small radiation exposures without the accompanying need for exorbitant photocurrent amplification and also without the accompanying difficulties involved in photomultiplier dark current. Another important factor is that the power is employed so economically by the use of the highly-peaked, short pulses as to bring the overall power requirements well within that dictated by portability considerations.

On the other hand, the entire combination of components adds measurably to its desirability and it is not the present intention to emphasize the high intensity, short pulses to the exclusion of such other important factors as the capability of metering these pulses, as well as the ability to utilize other components which readily adapt themselves to the desired geometry and power requirements.

These and other modifications and variations of the present invention are possible in the light of the above teachings. It is therefore to be understood that within the scope of the appended claims the invention may be practiced otherwise than as specifically described.

What is claimed is:

1. A dosimeter reader for use with a glass-type of dosimeter adapted upon exposure to light to exhibit fluorescence of an intensity proportional to its absorbed radiation, said reader comprising a fluorescence-producing arc-discharge high-firing potential light source, light source driving means adapted for producing high peak intensity low duty cycle light pulses, said light source being capable of directing said pulsed light onto said dosimeter whereupon the intensity of said dosimeter fluorescence is made a function of said pulse intensity, photodetector means responsive to said fluorescence for producing a photoelectric current proportional in amplitude to said fluorescence intensity, a current-indicating means directly responsive to said photoelectric current amplitude, and a self-contained low-voltage direct current power source for operatively energizing both said light source driving means and said indicating means, said indicating means directly indicating radiation absorption in said dosimeter due to the aforementioned relationship of said absorption to the exhibited fluorescence intensity, said indicating means including a peak voltmeter having pulse stretching means coupled to the photodetector output, and a voltmeter coupled to the output of said stretching means, and said driving means being adapted to produce light pulses with a duty cycle no greater than about one part in $10^5$.

2. The apparatus of claim 1 wherein said light source driving means is a relaxation oscillator.

3. The apparatus of claim 2 wherein said light source is formed of space discharge electrodes enclosed in an envelope filled with a gas having a thermal-power vaporization requirement substantially less than that of mercury.

4. The apparatus of claim 3 wherein said discharge electrodes have a firing potential of about 1250 volts.

References Cited in the file of this patent
UNITED STATES PATENTS

| | | |
|---|---|---|
| 2,491,342 | Townshend | Dec. 13, 1949 |
| 2,722,631 | Bowtell | Nov. 1, 1955 |
| 2,722,632 | Germeshausen | Nov. 1, 1955 |
| 2,935,613 | Tirico | May 3, 1960 |